(12) United States Patent
Ichikawa et al.

(10) Patent No.: US 9,958,345 B2
(45) Date of Patent: May 1, 2018

(54) ROTATING BODY NON-CONTACT POWER-FEEDING DEVICE AND TORQUE SENSOR

(71) Applicant: Hitachi Automotive Systems, Ltd., Hitachinaka-shi, Ibaraki (JP)

(72) Inventors: Katsuei Ichikawa, Tokyo (JP); Atsuo Soma, Hitachinaka (JP); Kentarou Miyajima, Hitachinaka (JP); Kisho Ashida, Hitachinaka (JP); Makoto Ishii, Hitachi (JP); Motohiro Sasaki, Hitachi (JP); Keisuke Iwaishi, Hitachi (JP); Yuuya Urushihata, Hitachi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days. days.

(21) Appl. No.: 15/109,453

(22) PCT Filed: Jan. 16, 2015

(86) PCT No.: PCT/JP2015/051098
§ 371 (c)(1),
(2) Date: Jul. 1, 2016

(87) PCT Pub. No.: WO2015/108152
PCT Pub. Date: Jul. 23, 2015

(65) Prior Publication Data
US 2016/0327444 A1    Nov. 10, 2016

(30) Foreign Application Priority Data

Jan. 20, 2014    (JP) .................................. 2014-008086

(51) Int. Cl.
*G01L 3/10*    (2006.01)
*H02J 17/00*    (2006.01)
(Continued)

(52) U.S. Cl.
CPC ............... *G01L 3/108* (2013.01); *B62M 6/50* (2013.01); *H01F 38/14* (2013.01); *H02J 17/00* (2013.01);
(Continued)

(58) Field of Classification Search
CPC .. H02J 5/005; H02J 17/00; H02J 50/80; H02J 50/90; H02J 50/12; B62M 6/50; G01L 3/108
(Continued)

(56) References Cited

U.S. PATENT DOCUMENTS 5,798,622 A     8/1998  Hirai et al.
8,508,184 B2 *  8/2013  Sakakibara ............. B60L 5/005
                                                    180/65.1
(Continued)

FOREIGN PATENT DOCUMENTS

EP    0 765 804 61    10/2002
JP       9-95289 A     4/1997
(Continued)

OTHER PUBLICATIONS

International Search Report (PCT/ISA/210) issued in PCT Application No. PCT/JP2015/051098 dated Mar. 24, 2015 with English translation (5 pages).
(Continued)

*Primary Examiner* — Harshad R Patel
*Assistant Examiner* — Octavia Hollington
(74) *Attorney, Agent, or Firm* — Crowell & Moring LLP

(57) ABSTRACT

A rotating body non-contact power-feeding device comprises: a power receiving-side substrate with a power receiving-side circuit component mounted thereat, which is fixed to a rotating shaft supported via a bearing and rotates as one with the rotating shaft; and a power transmitting-side sub-
(Continued)

strate with a power transmitting-side circuit component mounted thereat, which is fixed to a holding unit holding the bearing so that a substrate surface thereof faces opposite a substrate surface of the power receiving-side substrate and is connected with a power source, wherein: a power transmitting-side coil is formed with a conductive pattern so as to achieve a flat-plane spiral pattern with a plurality of turns at a substrate surface facing opposite the power receiving-side substrate and the power transmitting-side circuit component is mounted at another substrate surface, at the power transmitting-side substrate that includes a substrate front surface and a substrate back surface, a power receiving-side coil is formed with a conductive pattern so as to achieve a flat-plane spiral pattern with at least one turn at a substrate surface facing opposite the power transmitting-side substrate and the power receiving-side circuit component is mounted at another substrate surface, at the power receiving-side substrate that includes a substrate front surface and a substrate back surface; and the power transmitting-side coil and the power receiving-side coil are magnetically coupled with each other so as to allow power to be contactlessly fed from the power transmitting-side substrate to the power receiving-side substrate.

12 Claims, 13 Drawing Sheets

(51) Int. Cl.
*B62M 6/50* (2010.01)
*H02J 50/80* (2016.01)
*H02J 50/90* (2016.01)
*H02J 50/12* (2016.01)
*H01F 38/14* (2006.01)

(52) U.S. Cl.
CPC .............. *H02J 50/12* (2016.02); *H02J 50/80* (2016.02); *H02J 50/90* (2016.02)

(58) Field of Classification Search
USPC ............... 73/862.325, 862.331–862.338
See application file for complete search history.

(56) References Cited

U.S. PATENT DOCUMENTS

| | | | |
|---|---|---|---|
| 9,130,386 B2* | 9/2015 | Kawano | H02J 5/005 |
| 9,154,003 B2* | 10/2015 | Ichikawa | H02J 5/005 |
| 9,293,929 B2* | 3/2016 | Hong | H02J 5/005 |
| 9,583,949 B2* | 2/2017 | Kawano | H02J 17/00 |
| 9,601,265 B2* | 3/2017 | Sugino | H01F 38/14 |
| 2012/0228956 A1 | 9/2012 | Kamata | |
| 2015/0263536 A1* | 9/2015 | Niizuma | B60L 11/1829 307/104 |
| 2016/0144727 A1* | 5/2016 | Tokura | H01F 38/14 307/104 |

FOREIGN PATENT DOCUMENTS

| | | |
|---|---|---|
| JP | 2007-208201 A | 8/2007 |
| JP | 2012-5189 A | 1/2012 |
| WO | WO 2013/112526 A1 | 8/2013 |

OTHER PUBLICATIONS

Japanese-language Written Opinion (PCT/ISA/237) issued in PCT Application No. PCT/JP2015/051098 dated Mar. 24, 2015 (3 pages).
Extended European Search Report issued in counterpart European Application No. 15737373.9 dated Aug. 14, 2017 (10 pages).
Waters et al., "Optimal Coil Size Ratios for Wireless Power Transfer Applications", 2014 IEEE International Symposium on Circuits and Systems (ISCAS), Jun. 30, 2014, pp. 2045-2048, XP055395543.

* cited by examiner

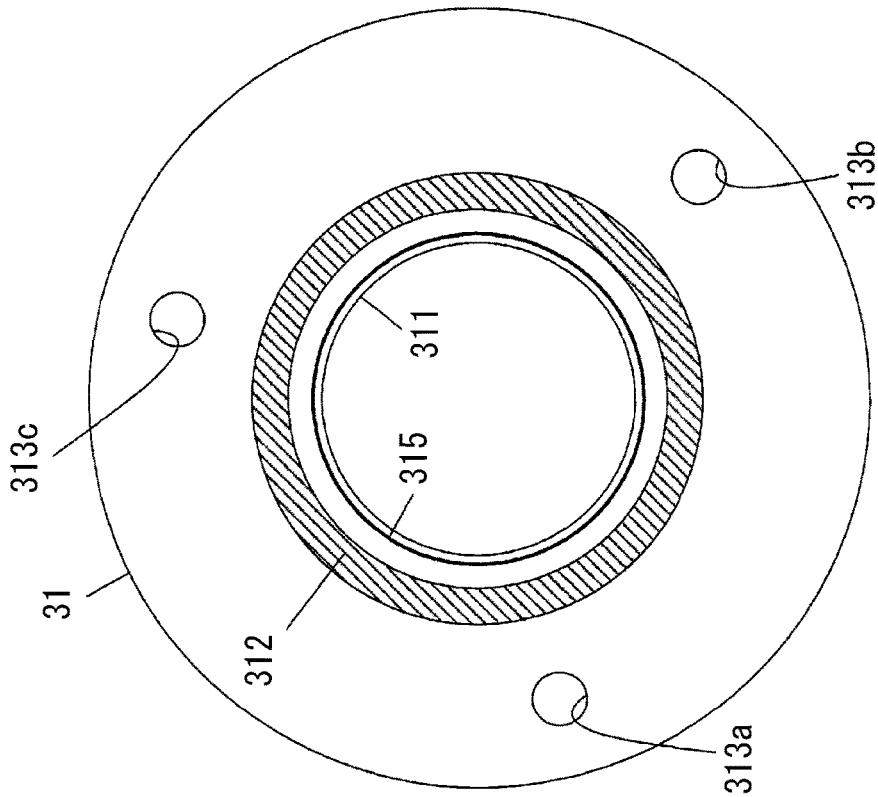
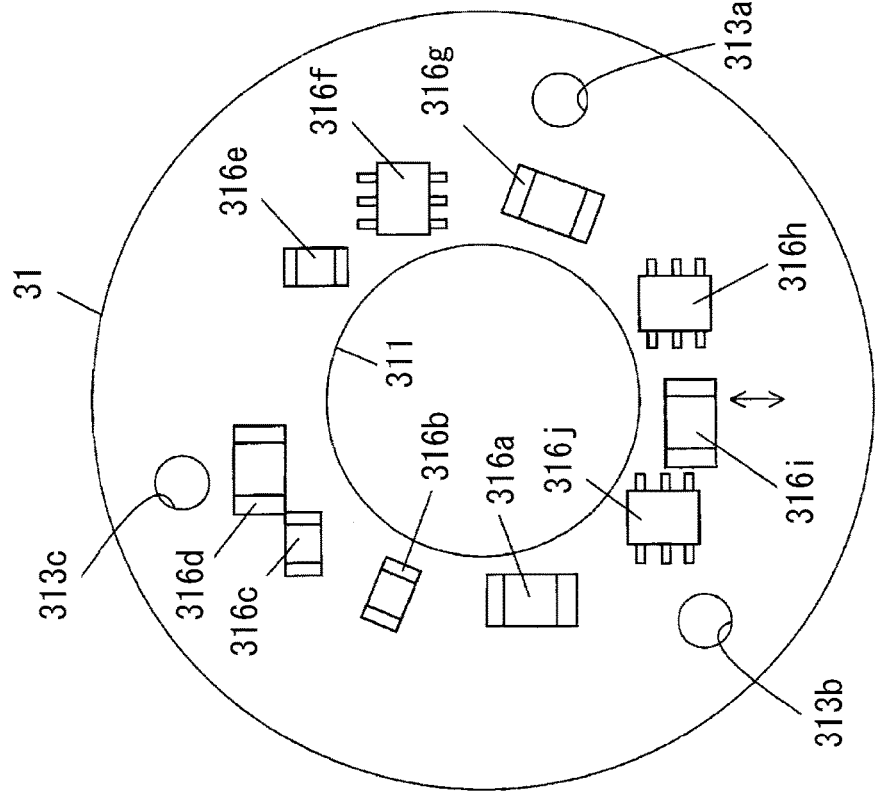

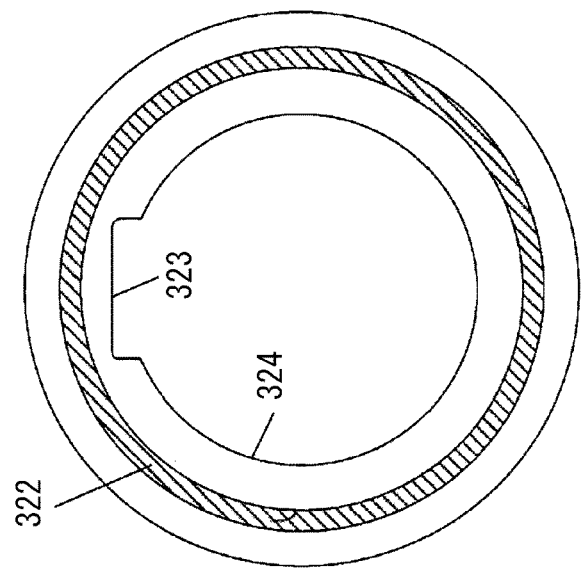
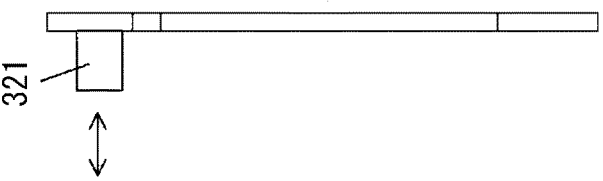
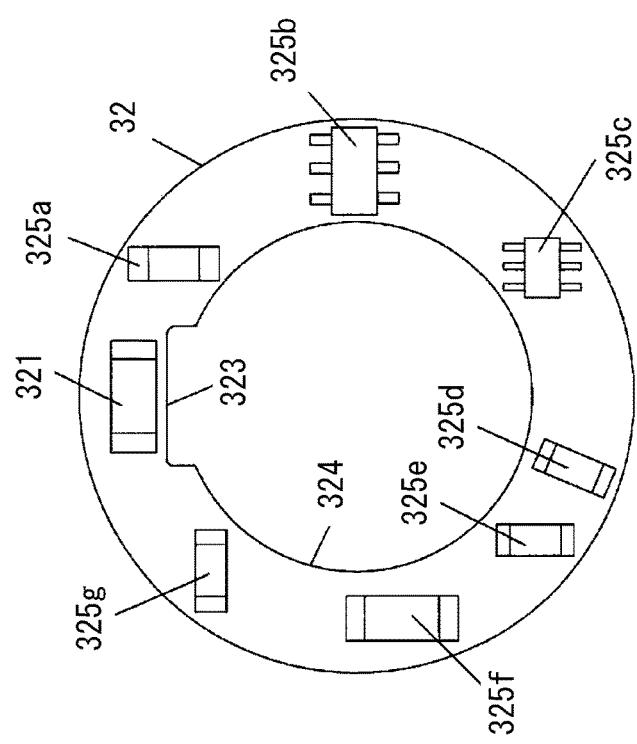

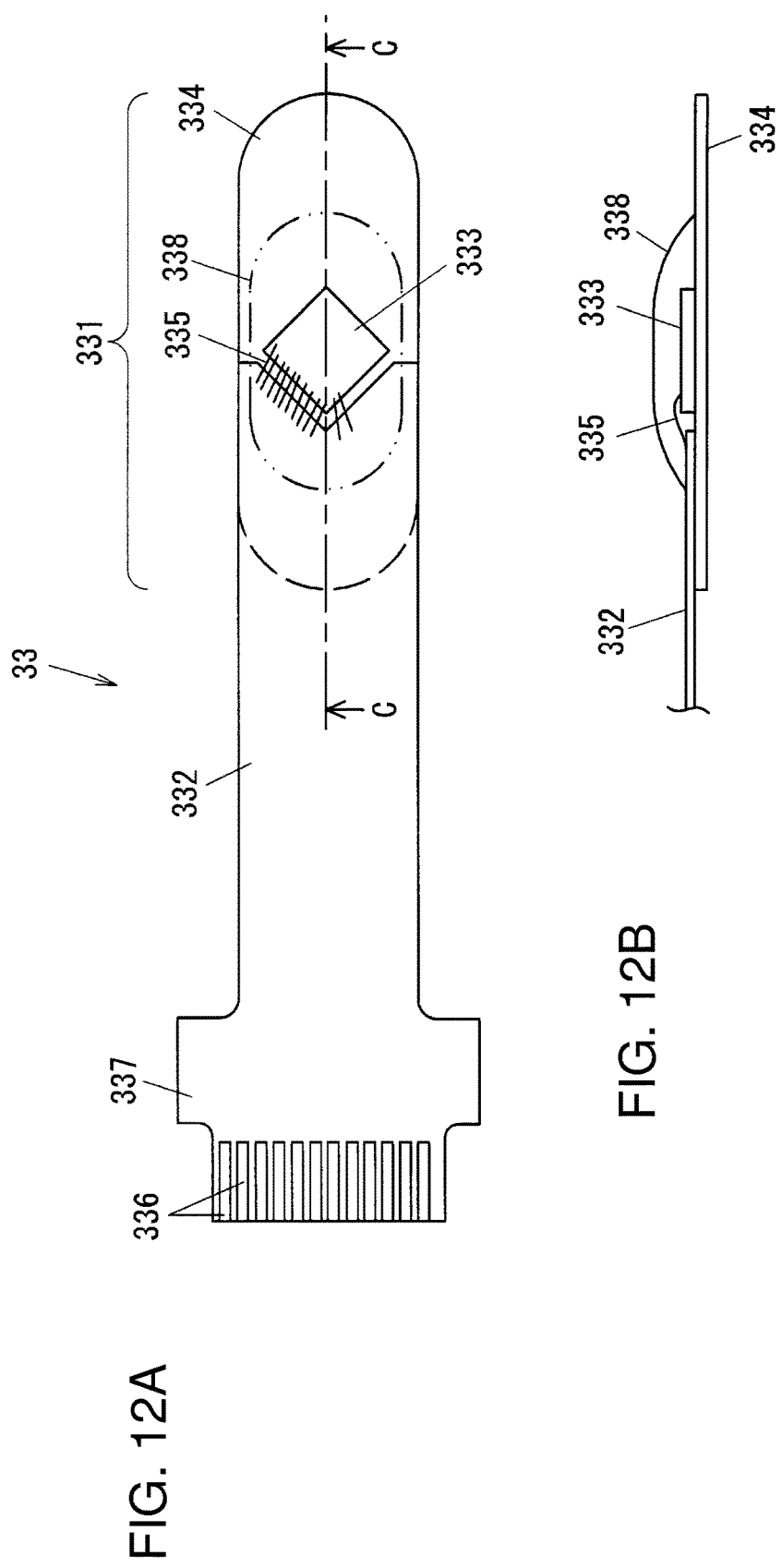

ROTATING BODY NON-CONTACT POWER-FEEDING DEVICE AND TORQUE SENSOR

TECHNICAL FIELD

The present invention relates to a rotating body non-contact power-feeding device and a torque sensor that may be adopted in a rotating body.

BACKGROUND ART

In a motor-assisted bicycle in the related art, the rotational torque applied to a crankshaft of the bicycle is detected through a non-contact means and the drive force imparted by a motor is used to assist the rider with pedaling. The rotational torque may be detected with, for instance, a magnetostrictive torque sensor having a magnetostrictive detection layer that is rendered magnetically anisotropic, formed at an outer circumferential surface or the like of the crankshaft, and a coil disposed on the outer circumferential side of the magnetostrictive detection layer with a predetermined gap formed between them (see PTL1).

In addition, in a standard torque measuring method known in the related art, torque applied to a rotating shaft is measured via a strain sensor, which measures the torque applied to the rotating shaft by measuring the extent of strain at the rotating shaft with a strain gauge.

CITATION LIST

Patent Literature

PTL1: Japanese Laid Open Patent Publication No. H09-95289

SUMMARY OF INVENTION

Technical Problem

A torque sensor configured with a strain gauge has advantages over a magnetostrictive torque sensor in that it can be provided as a more compact unit assuring better accuracy and that it can be manufactured at lower cost. However, the strain gauge torque sensor requires a non-contact power-feeding device capable of wireless power feeding in order to supply power to the strain gauge mounted at the rotating shaft. In addition, data must be wirelessly transmitted from the strain gauge mounted at the rotating shaft.

Furthermore, since wireless power feeding is achieved in conjunction with a power receiving-side coil disposed at the crankshaft of the motor-assisted bicycle, miniaturization of the torque sensor needs to be pursued while assuring a high level of power feeding efficiency.

Solution to Problem

According to an aspect of the present invention, a rotating body non-contact power-feeding device comprises: a power receiving-side substrate with a power receiving-side circuit component mounted thereat, which is fixed to a rotating shaft supported via a bearing and rotates as one with the rotating shaft; and a power transmitting-side substrate with a power transmitting-side circuit component mounted thereat, which is fixed to a holding unit holding the bearing so that a substrate surface thereof faces opposite a substrate surface of the power receiving-side substrate and is connected with a power source, wherein: a power transmitting-side coil is formed with a conductive pattern so as to achieve a flat-plane spiral pattern with a plurality of turns at a substrate surface facing opposite the power receiving-side substrate and the power transmitting-side circuit component is mounted at another substrate surface, at the power transmitting-side substrate that includes a substrate front surface and a substrate back surface, a power receiving-side coil is formed with a conductive pattern so as to achieve a flat-plane spiral pattern with at least one turn at a substrate surface facing opposite the power transmitting-side substrate and the power receiving-side circuit component is mounted at another substrate surface, at the power receiving-side substrate that includes a substrate front surface and a substrate back surface; and the power transmitting-side coil and the power receiving-side coil are magnetically coupled with each other so as to allow power to be contactlessly fed from the power transmitting-side substrate to the power receiving-side substrate,

Advantageous Effects of Invention

A to the present invention, a compact rotating body non-contact power-feeding device, assuring outstanding power feeding efficiency, and a torque sensor equipped with the rotating body non-contact power-feeding device are provided.

BRIEF DESCRIPTION OF DRAWINGS

FIG. 6 An example of measures that may be taken at the various terminals on the fixed-side substrate 31 in order to prevent erroneous operation that may readily occur due to introduced noise or the like.

FIGS. 7A and 7B Illustrations of the fixed-side substrate 31.

FIGS. 8A-8C Illustrations of the rotating-side substrate 32.

FIGS. 12A and 12B Illustrations of the strain sensor unit 33.

DESCRIPTION OF EMBODIMENTS

Figure 1:
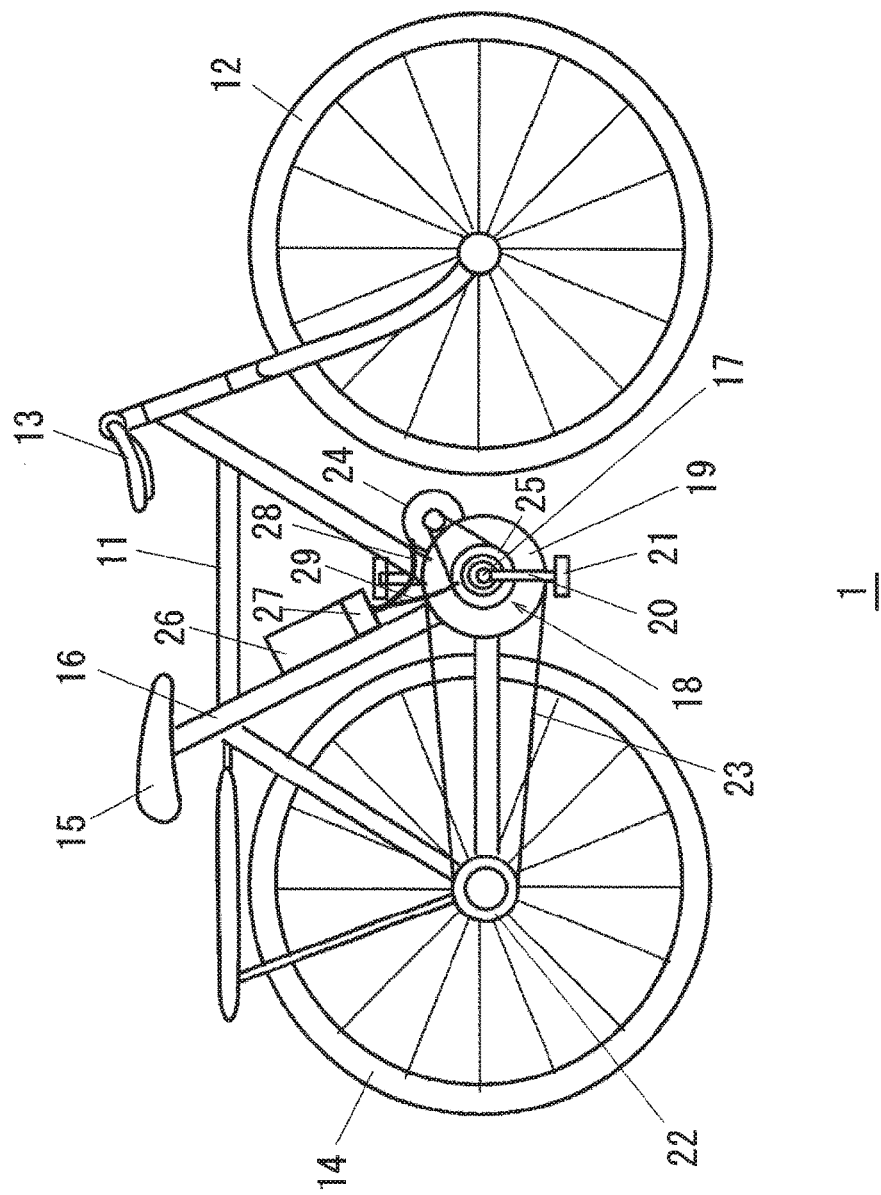
FIG. 1 An illustration of the torque sensor achieved in an embodiment of the present invention.

The following is a description of an embodiment of the present invention, given in reference to drawings. FIG. 1 schematically illustrates the structure of a motor-assisted bicycle 1, in which the torque sensor achieved in an embodiment of the present invention is installed.

The motor-assisted bicycle 1 includes a front wheel 12 and a handle bar 13 located on the front side of a frame 11 and a rear wheel 14 located on the rear side of the frame 11. A bottom bracket 18 holding bearings, is disposed at the bottom end of a seat tube 16, which includes a saddle 15. A crankshaft 17 is supported by the bearings at the bottom bracket 18. A chain wheel 19 and crank arms 20 are mounted at the crankshaft 17, with pedals 21 attached to the crank arms 20. A roller chain 23 is disposed on as to run in a loop between the chain wheel 19 and a sprocket 22 located at the rear wheel 14. The rotation of the crankshaft 17 is transmitted to the rear wheel 14, i.e., the drive wheel via the roller chain 23.

In addition, an assist motor 24 is installed at the motor-assisted bicycle 1. With assistance provided by the motor 24, which rotationally drives a drive sprocket 25 disposed at the crankshaft 17, the amount of pedaling force required from the rider at the pedals 21 can be reduced. As will be described later, a torque sensor (not shown) used to measure the torque applied to the crankshaft 17 is installed at the motor-assisted vehicle 1. An assist control unit 27 determines an assist quantity, i.e., an extent of assistance to be provided, in correspondence to the measured torque and drives the motor 24 by a degree matching the required assist quantity.

A battery 26 that provides power to the motor 24 is mounted at the seat tube 16. A power supply cable 28 is connected between the assist control unit 27, which executes assist control, and the motor 24. In addition, a cable 29 for power supply and data signal transmission is connected between the assist control unit 27 and a rotating-side substrate (not shown but will be described in detail later) disposed at the torque sensor.

Figure 2:
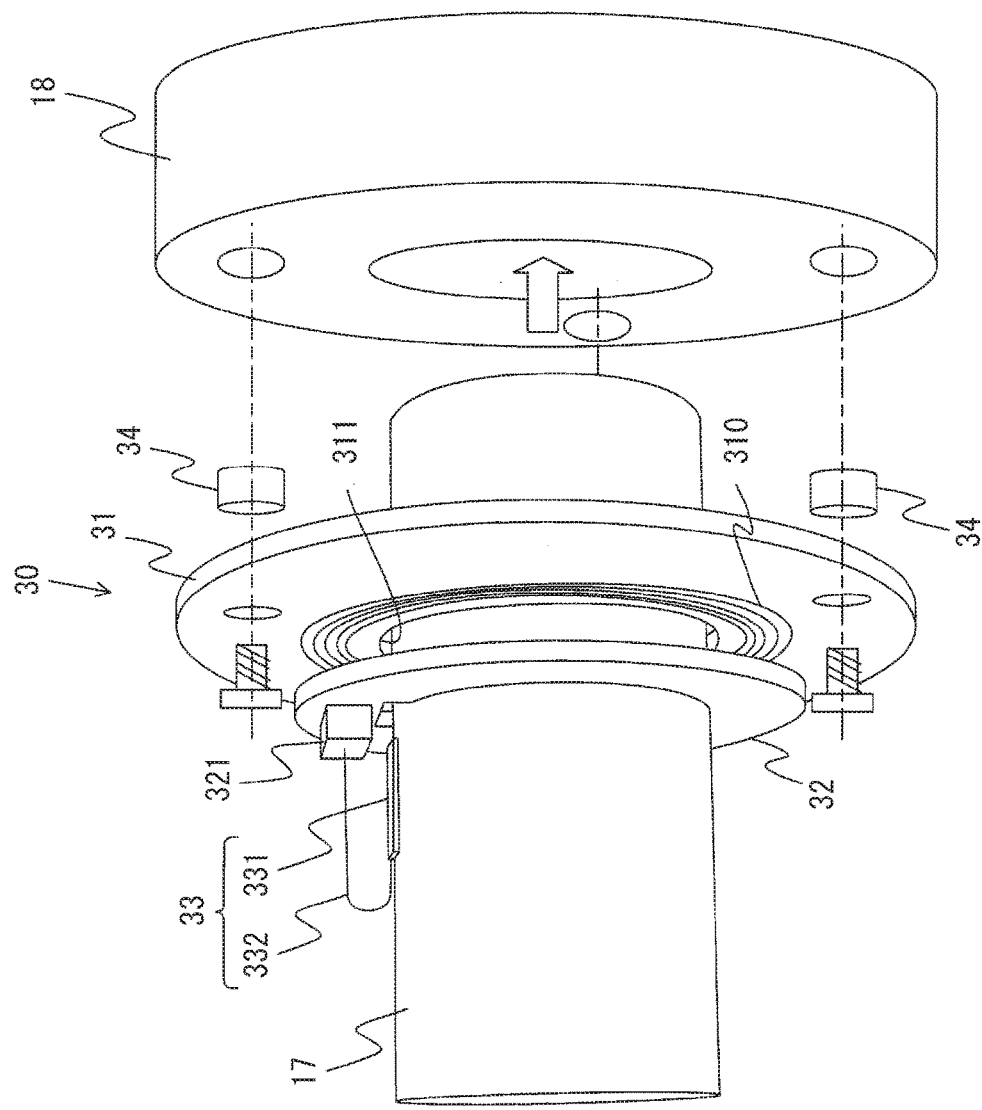
FIG. 2 A perspective showing the overall structure of the torque sensor.

FIG. 2 shows the overall structure of the torque sensor in a perspective. A torque sensor 30 includes a fixed-side substrate 31, which is fixed to the bottom bracket 18, and a rotating-side substrate 32 and a strain sensor unit 33, both of which are fixed to the crankshaft 17 and rotate as one with the crankshaft 17. A bearing unit (not shown) that supports the crankshaft 17 is disposed at the bottom bracket 18. The fixed-side substrate 31, which is a substantially ring-shaped member, is screwed to the bottom bracket 18 via spacers 34. The crankshaft 17 is inserted through a through hole 311 at the fixed-side substrate 31 with some clearance. The rotating-side substrate 32, which is also a substantially ring-shaped member, is fixed to the outer circumferential surface of the crankshaft 17. The rotating-side substrate 32 may be fixed by, for instance, locking a substrate holder to the crankshaft 17 and securing the rotating-side substrate 32 to the substrate holder.

The rotating-side substrate 32 is fixed so that the substrate surface ranges substantially perpendicular to the crankshaft 17. The fixed-side substrate 31 and the rotating-side substrate 32 are disposed so as to range substantially parallel to each other via a small clearance between them, and antenna patterns constituted of copper or the like are formed at the surfaces of the fixed-side substrate 31 and the rotating-side substrate 32 facing opposite each other. Reference 310 indicates an antenna pattern formed at the fixed-side substrate 31. At the surfaces of the fixed-side substrate 31 and the rotating-side substrate 32, located on the side opposite from the surfaces where the antenna patterns are formed, circuit components configuring the torque sensor 30 and wiring patterns connecting the circuit components are disposed. The spacers 34 mentioned earlier are disposed so as to prevent the circuit components mounted at the fixed-side substrate 31 from coming into contact with the bottom bracket 18.

The strain sensor unit 33 includes a detection unit 331 stuck to the crankshaft 17 and a flexible cable 332 that connects the detection unit 331 to the rotating-side substrate 32. The detection unit 331 includes a built-in A/D converter, and a detected voltage corresponding to the level of strain is converted via the A/D converter to a digital signal, which is then output from the detection unit 331. The flexible cable 332 is connected to a connector 321 disposed at the rotating-side substrate 32.

Figure 3:
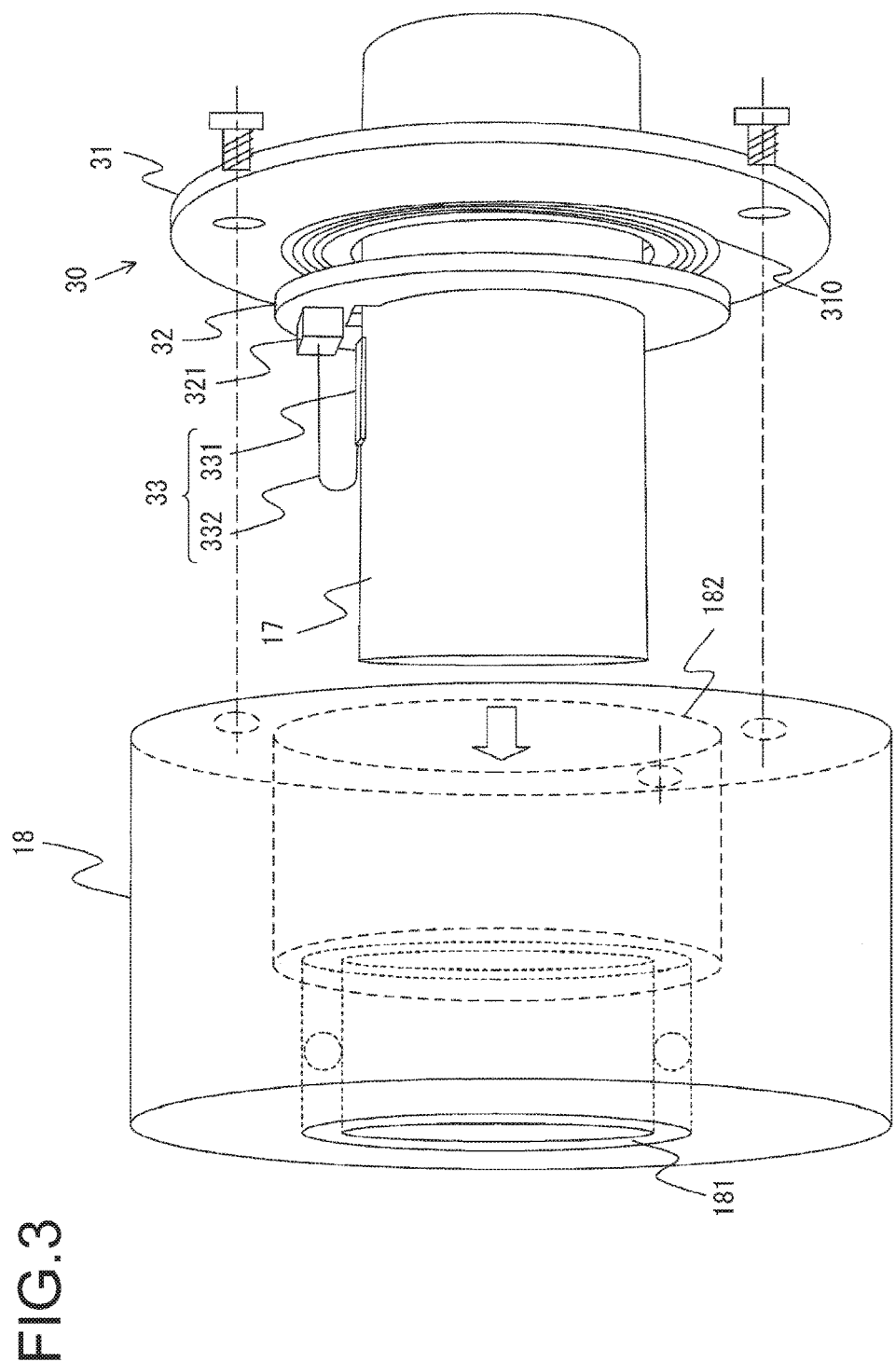
FIG. 3 Another example of a mounting structure that may be adopted for the torque sensor.

FIG. 3 presents another example of a mounting structure that may be adopted in conjunction with the torque sensor 30. In the example presented in FIG. 3, a housing space 182, where the rotating-side substrate 32 and the strain sensor unit 33 are to be housed, is formed at the bottom bracket 18 holding therein a bearing unit 181, which supports the crankshaft 17. As the crankshaft 17 is mounted at the bearing unit 181, the rotating-side substrate 32 and the strain sensor unit 33 are placed inside the housing space 182. The fixed-side substrate 31 is screwed to an end surface of the bottom bracket 18.

Figure 4:
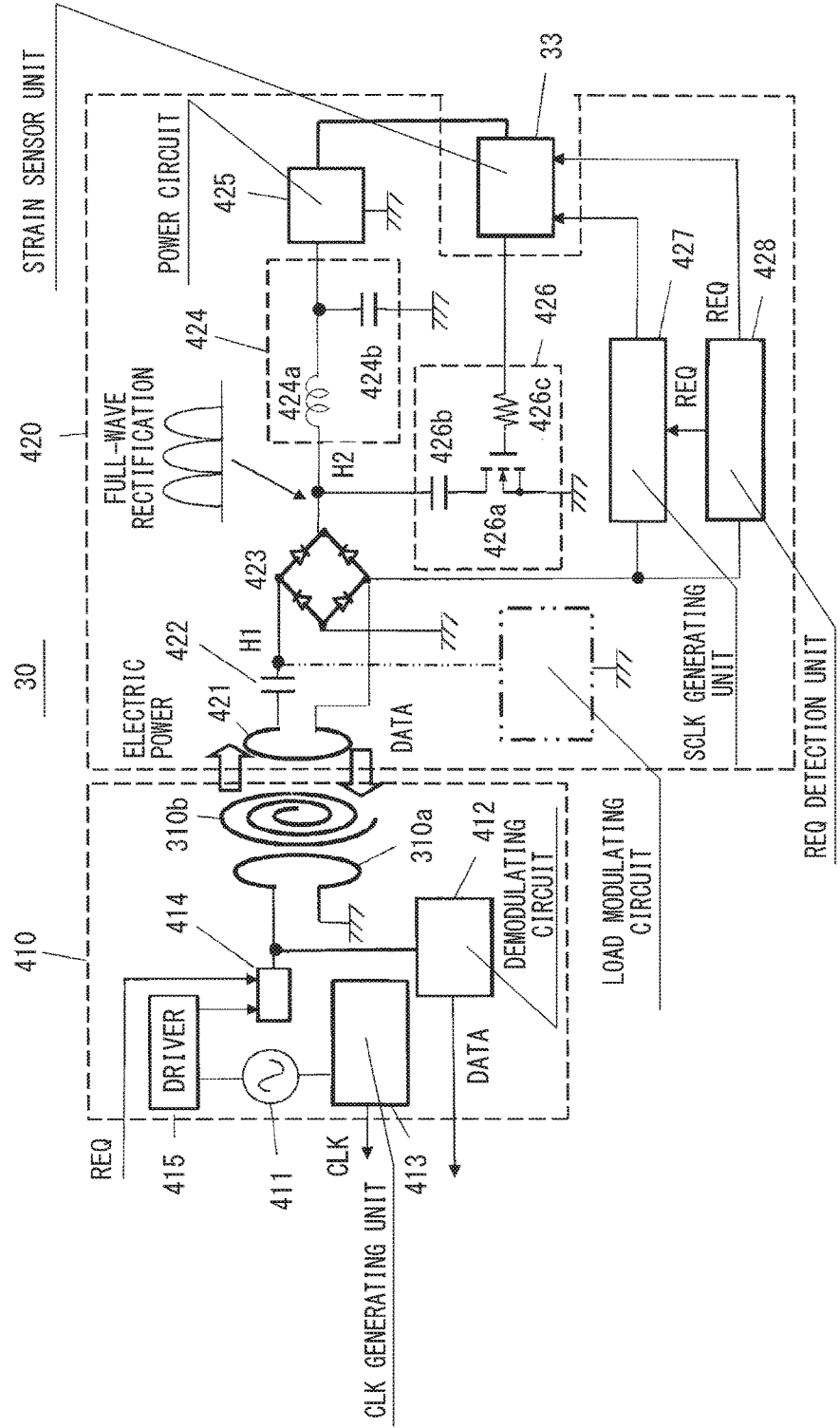
FIG. 4 A block diagram showing the circuit structure of the torque sensor.

FIG. 4 is a block diagram showing the circuit structure of the torque sensor 30. Electric power is supplied from a power-transmitting unit 410 to a power-receiving unit 420 in FIG. 4. The power-transmitting unit 410 is disposed at the fixed-side substrate 31 in FIG. 2, whereas the power-receiving unit 420 is disposed at the rotating-side substrate 32. The power-transmitting unit 410 and the power-receiving unit 420 configure a non-contact power-feeding device in the torque sensor 30 in FIG. 4.

The power-transmitting unit 410 includes an oscillator 411, a power feeding coil 310*a* and a resonance coil 310*b*, which configure a power transmitting-side coil, a demodulating circuit 412, a clock (CLK) generating unit 413, a modulating unit 414 and a driver 415. The antenna pattern 310 in FIG. 2 is made up with a pattern formed with the power feeding coil 310*a* and a pattern formed with the resonance coil 310*b*. It is to be noted that while the coil surfaces of the power feeding coil 310*a* and the resonance coil 310*b*, formed as flat-plane windings, face opposite each other in the illustration provided in FIG. 4, the power feeding coil 310*a* is actually disposed so as to range within the same plane as the resonance coil 310*b* on the outer circumferential side thereof, as will be described in detail later, The power-receiving unit 420 includes a power receiving-side coil (also referred to as a load coil) 421, a resonance capacitor 422 connected in series to the power receiving-side coil 421, a rectifier circuit 423, a low pass filter 424, a power circuit 425, a load modulating circuit 426, a clock (SCLK) generating unit 427, and an REQ detection unit 428. The power receiving-side coil 421 and the resonance capacitor 422 connected in series configure a serial resonance circuit. The strain sensor unit 33 is connected to the serial resonance circuit via the rectifier circuit 423 and the power circuit 425. It is to be noted that the power receiving-side coil 421 may assume a single turn or a plurality of turns.

The low pass filter 424 includes an inductor 424*a* and a capacitor 424*b*. The load modulating circuit 426 includes a switching element 426*a*, a capacitor 426*b* and a resistor 426*c*. A strain data signal (having undergone A/D conversion) provided by the strain sensor unit 33 is input to a gate of the switching element 426*a* via the resistor 426*c* in the load modulating circuit 426.

If the capacitive component of the resonance at the resonance coil 310b were entirely accounted for by the stray capacitance (parasitic capacitance) manifesting between the winding line portions of the coil, the resonance frequency adjustment would be complicated, and accordingly, a resonance capacitor is connected to the resonance coil 310b in the embodiment, as will be explained later (see FIG. 9). Based upon a signal provided by the oscillator 411, the driver 415 feeds power to the power feeding coil 310a. Power is fed to the power feeding coil 310a with a frequency (e.g., 16.384 MHz) equal to the self-resonance frequency, which is determined by the self inductance, the stray capacitance manifesting between the coil winding and the resonance capacitance at the resonance coil 310b.

As the resonance coil 310b is excited with a frequency equal to the self-resonance frequency through an electromagnetic induction effect, a large current flows through the resonance coil 310b, thereby generating an intense magnetic field. The self-resonance frequency f of the coil may be calculated as expressed in (1) below with L representing the inductance value at the resonance coil 310b and C representing the capacitance (including the capacitance of the resonance capacitor) at the resonance coil 310b.

$$f=1/(2\pi\sqrt{(LC)}) \quad (1)$$

When the power receiving-side coil 421 of the power-receiving unit 420 is disposed in close proximity to the resonance coil 310b, the intense magnetic field generated via the resonance coil 310b becomes magnetically coupled with the power receiving-side coil 421, thereby generating an electromotive force between the two terminals at the power receiving-side coil 421. The electromotive force thus generated is rectified via the rectifier circuit 423 and thus becomes a DC voltage, which is then input to the power circuit 425 via the low pass filter 424. The presence of the low pass filter 424 disposed at a stage rearward relative to the rectifier circuit 423 improves the rectification efficiency. The power circuit 425 converts the voltage output from the rectifier circuit 423 to a voltage with a predetermined voltage value required by the strain sensor unit 33 and provides the voltage resulting from the conversion to the strain sensor unit 33.

In the embodiment, the torque applied to the crankshaft 17 is detected by detecting strain in the crankshaft with a strain sensor (strain gauge). While a torque sensor configured with a strain sensor achieves advantages over a conventional torque sensor configured with, for instance, a magnetostrictive sensor, in that it can be provided as a more compact unit assuring better accuracy and that it can be manufactured at lower cost, electric power must be supplied to the torque sensor configured with a strain sensor. Power must be fed wirelessly to the strain sensor disposed at the rotating side crankshaft, since power feeding via a contact point such as a brush would give rise to concerns such as compromised durability and brush contact noise.

As described earlier, the power-receiving unit 420 in the embodiment, which is disposed at the rotating-side substrate 32, is able to contactlessly receive power transmitted from the power-transmitting unit 410 through magnetic coupling of the power transmitting side resonance coil 310b and the power receiving-side coil 421. In addition, since power can be received on the power receiving side with the power receiving-side coil 421 alone, the power-receiving unit 420, i.e., the rotating-side substrate 32 can be miniaturized.

Next, transmission of strain data from the power-receiving unit 420 to the power-transmitting unit 410 will be explained. Data are transmitted in the embodiment by adopting a load modulation method that does not to require much power and allows a simple circuit structure. While a load modulation system is also adopted in IC cards and the like, much stronger coupling between coils is achieved through non-contact power feeding (wireless power feeding) as achieved in the embodiment described above.

While the load modulating circuit is connected at a point H1 indicated by the two-point chain line in FIG. 4 in the related art, high coupling strength gives rise to a problem in that a greater fluctuation in the impedance attributable to fluctuation in the distance between the substrates 31 and 32 with the antenna patterns (i.e., the patterns formed on the substrates with the coils 310a, 310b and 421) formed thereat, the material constituting the crankshaft 17 located near the antenna patterns and the like leads to a significant change in the degree of load modulation. A greater degree of modulation may result in a significant drop in the power feeding efficiency, which could even disable circuit operation at the power-receiving unit 420.

Accordingly, instead of the positional arrangement in the related art, which functions well enough as long as the level of magnetic coupling strength remains relatively low, the load modulating circuit 426 is connected at a point H2, located between the rectifier circuit 423 and the low pass filter 424, so as to apply load modulation in the embodiment in which a high level of magnetic coupling strength is achieved. In order to transmit strain data from the power-receiving unit 420 to the power-transmitting unit 410, a strain data signal is input from the strain sensor unit 33 to the load modulating circuit 426. The switching element 426a is engaged in ON/OFF operation in response to the strain data signal. This ON/OFF operation causes fluctuation in the impedance on the power receiving side, which changes reflection of the carrier wave (AC magnetic field) from the power-transmitting unit 410. Namely, the amplitude of the carrier wave reflected at the power receiving-side coil 421 fluctuates in correspondence to the impedance fluctuation. The power-transmitting unit 410 obtains the strain data by executing demodulation processing on the reflected carrier wave at the demodulation circuit 412.

By connecting the load modulating circuit 426 at the point H2 instead of at the point H1 as in the related art, impedance fluctuations attributable to load modulation can be better suppressed, due to the presence of the rectifier circuit 423 disposed between the load modulating circuit 426 and the power receiving-side coil 421. As a result, the degree of modulation does not become excessively high and thus, any significant decrease in the power feeding efficiency is prevented even in the embodiment in which high magnetic coupling strength is achieved.

Next, the method adopted to achieve data transmission synchronization will be explained. The clock (CLK) generating unit 413 generates a clock signal (CLK) by dividing a signal output by the oscillator 411. It may generate, for instance, a 16 kHz clock signal by dividing a 16.384 MHz signal output from the oscillator 411. The power-transmitting unit 410 is engaged in operation based upon the clock signal (CLK). At the power-receiving unit 420, a clock signal (SCLK) with a frequency matching that of the clock signal (CLK) is generated by dividing, via the clock (SCLK) generating unit 427, an AC signal (carrier wave) received at the power receiving-side coil 421. The power-receiving unit 420 is engaged in operation based upon the clock signal (SCLK).

Figure 5A:
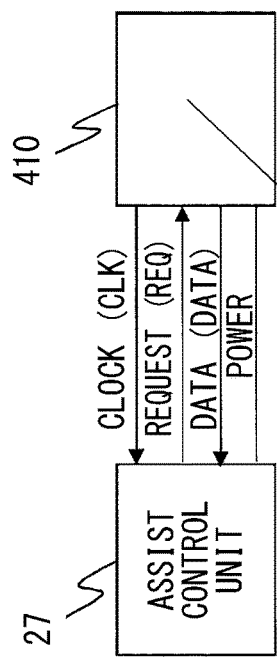
FIGS. 5A and 5B Diagrams illustrating how data are exchanged between the assist control unit 27 and the power-transmitting unit 410 disposed at the fixed-side substrate 31.
Figure 5B:
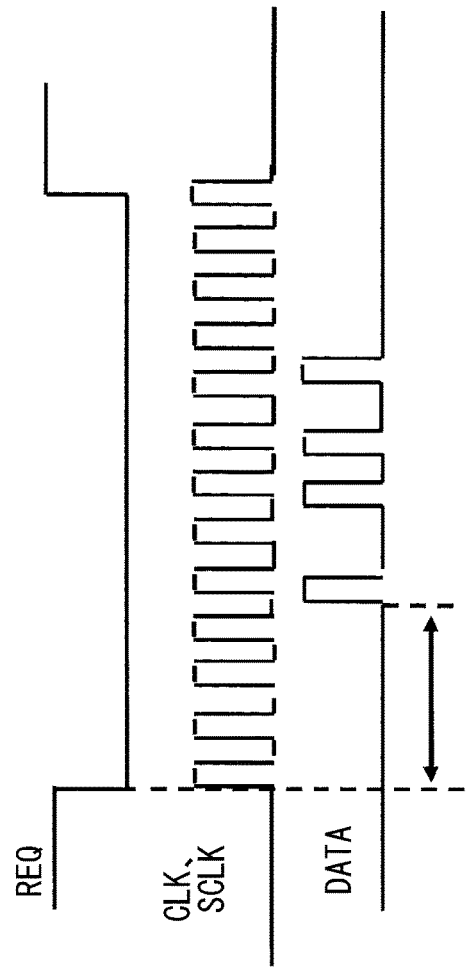

Strain data are transmitted from the power-receiving unit 420 to the power-transmitting unit 410 based upon a request signal (REQ) provided by the assist control unit 27 shown in FIG. 1, FIG. 5 illustrates how data transmission operation is executed to transmit data between the assist control unit 27 and the power-transmitting unit 410 disposed at the fixed-side substrate 31. The strain data (DATA) output from the strain sensor unit 33 stuck to the crankshaft 17 are received, via the power-receiving unit 420 located at the rotating-side substrate 32, at the power-transmitting unit 410 located at the fixed-side substrate 31 and are further transmitted to the assist control unit 27 connected to the fixed-side substrate 31. The assist control unit 27 calculates a pedaling force imparted by the rider based upon the strain data transmitted thereto and determines an assist quantity indicating the level of assistance to be provided via the assist motor 24.

As indicated in FIG. 5(a), the assist control unit 27 outputs a request signal (REQ) requesting strain data to the power-transmitting unit 410 (falling operation). As shown in FIG. 4, the request signal (REQ) is input to the modulating unit 414 in the power-transmitting unit 410 so as to modulate a power feed signal to be provided to the power feeding coil 310a with the request signal (REQ). Through this modulation, the amount of transmitted power is altered relative to the pre-modulation state, and accordingly, the change in the amount of transmitted power is detected by the REQ detection unit 428 on the power receiving side no as to use it as a trigger for data transmission. Namely, a trigger for data transmission is generated by controlling, via the driver 415, the modulating unit 414 to which the request signal (REQ) is input.

At the power-receiving unit 420 having received the AC signal modulated by using the request signal (REQ), the request signal (REQ) detection unit 428 extracts the request signal (REQ), which is then input to the clock (SCLK) generating unit 427 and the strain sensor unit 33. In synchronization with the fall of the request signal (REQ), the clock (SCLK) generating unit 427 provides the clock signal (SCLK) to the strain sensor unit 33. The A/D converter included in the strain sensor unit 33 is engaged in operation based upon the clock signal (SCLK). The strain sensor unit 33 starts output of a strain data signal after a predetermined number of cycles (after four cycles in the example presented in FIG. 5) following the rise of the clock signal (SCLK).

The power-transmitting unit 410 disposed at the fixed-side substrate 31 outputs the strain data (DATA), having been received from the power-receiving unit 420 and demodulated via the demodulating circuit 412 and the clock signal (CLK) synchronous with the clock signal (SCLK), to the assist control unit 27.

Unlike in the embodiment described above, in which the clock signal (SCLK) is started in synchronization with the fall of the request signal (REQ), the clock may be engaged in operation at all times independently of the request signal (REQ) and in such a case, the clock signal (SOX) cannot be synchronized with the fall of the request signal (REQ). For this reason, a temporal offset, the extent of which is less than a single cycle of the clock signal (SCLK), may occur with regard to the time elapsing before the data are output following the fall of the request signal (REQ), and under such circumstances, an erroneous operation may occur during data acquisition.

In the embodiment, the clock signal (SCLK) is started with the timing with which the request signal (REQ) falls, and thus, the request signal (REQ) and the clock signal (SCLK) are synchronized with each other. As a result, an improvement is achieved with regard to the temporal offset that occurs before the data are output following the fall of the request signal (REQ).

It is to be noted that the cycles of the request signal (REQ) and the cycles of the clock signal (SCLK) in FIG. 5 may be, for instance, 250 ms and 62.5 µs respectively.

Figure 6:
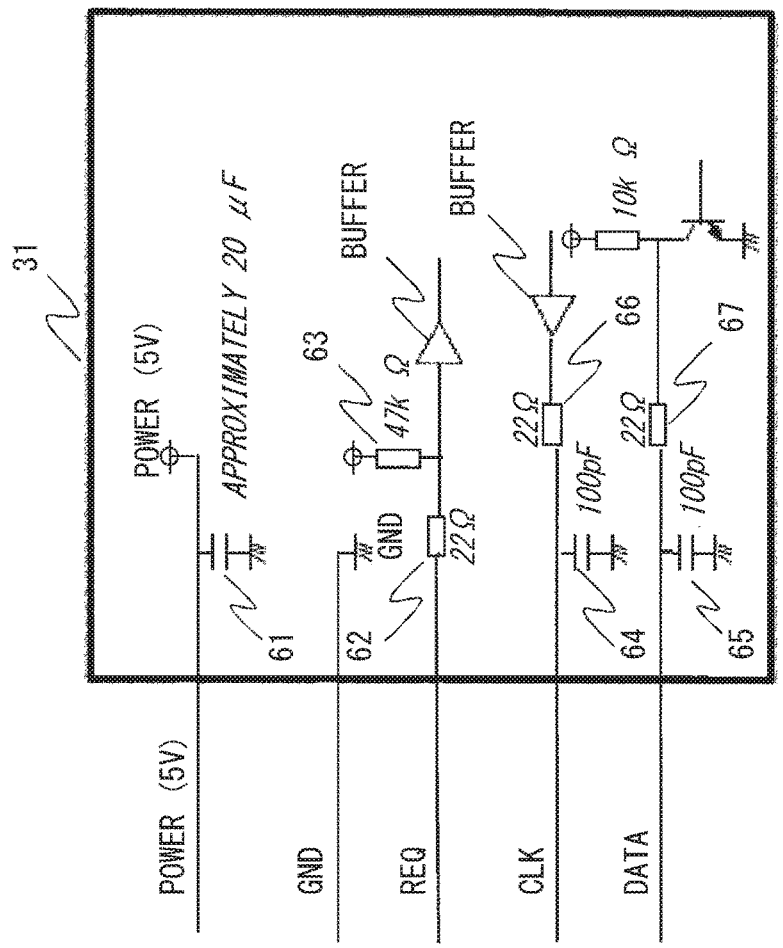

FIG. 6 presents an example of measures that may be taken at the various terminals at the fixed-side substrate 31 in order to prevent erroneous operation that may occur when external noise or the like is introduced. A capacitor 61 with a relatively large capacitance value is used for high-frequency grounding at the power line so as to prevent noise from entering the power line. In addition, a resistor 62 is inserted in series at the request signal (REQ) line so as to minimize the adverse effect of introduced noise. It is to be noted that a request signal bias is applied from the power line via a resistor 63 so as to enable the fall of a request signal (REQ) even when the request signal (REQ) is output from the assist control unit 27 in an open drain configuration.

In addition, the clock (CLK) signal terminal and the DATA signal terminal are grounded with capacitors 64 and 65, each achieving an impedance, which is higher relative to the signal frequency and at the same time, sufficiently low relative to any introduced noise. In addition, resistors 66 and 67 are inserted in series at the lines for the clock (CLK) signal and the DATA signal respectively so as to deter any noise that might otherwise be introduced. While measures against erroneous operation are taken through small-capacitance grounding and insertion of serial resistors in the example presented in FIG. 6, the present invention is not limited to the example presented in FIG. 6 and measures may be taken through either small-capacitance grounding alone or serial resistor insertion alone.

FIG. 7 shows the fixed-side substrate 31. FIG. 7(a) shows the mounting surface at which power transmitting-side circuit components are mounted. FIG. 7(b) shows the surface located on the side opposite from the mounting surface shown in FIG. 7(a), which is a pattern surface where the antenna pattern 310 (see FIG. 2) is formed.

As shown in FIG. 7(a), the through hole 311, through which the crankshaft 17 (see FIG. 2) passes, is formed at the center of the circular fixed-side substrate 31. Toward the outer edge of the fixed-side substrate 31, through holes 313a, 313b and 313c, via which the substrate is mounted, are formed. It is to be noted that the through holes 313a, 313b and 313c may be formed at such positions that the plurality of through holes 313a, 313b and 313c are set apart from the center of the through hole 311 (i.e., the centers of the coils 310a and 310b) by distances different from one another. In such a case, the fixed-side substrate 31 can never be locked onto the bottom bracket 18 at the wrong angle.

Circuit components 316a through 316j are mounted at the mounting surface so as to surround the through hole 311. The circuit component 316i is a connector to which the cable 29 shown in FIG. 1 is connected. The cable 29 is plugged in/out along the directions indicated by the arrows in the figure.

The antenna pattern 310 is formed in a hatched area 312 in a ring shape at the fixed-side substrate 31 in FIG. 7(b). The antenna pattern 310 is formed with copper in the ring-shaped area at the fixed-side substrate 31. As explained earlier (see FIG. 4), the antenna pattern 310 is made up with the pattern at the power feeding coil 310a and the pattern at the resonance coil 310b.

In addition, a looped ground pattern (GND pattern) 315 is formed no as to range in a full circle around the through hole 311 near the inner edge of the fixed-side substrate 31. As shown in FIG. 2, the crankshaft 17 constituted of metal is inserted through the through hole 311, and thus, the presence of the ground pattern 315 formed as described above makes it possible to reduce the extent to which the antenna pattern 310 (the power feeding coil 310a and the resonance coil 310b) is magnetically affected by the crankshaft 17. It is desirable that the distance between the ground pattern 315. Which is a factor that will affect the transmission loss, and the antenna pattern 310 be maximized. In addition, the wiring pattern connecting the individual circuit components must be laid out by ensuring that it does not form a loop circling the through hole 311, in order to prevent magnetic interference between the wiring pattern and the antenna pattern 310.

FIG. 8 shows the rotating-side substrate 32. FIG. 8(a) shows the mounting surface at which power receiving-side circuit components are mounted. FIG. 8(b) presents a sectional view of the rotating-side substrate 32. FIG. 8(c) shows the surface located on the side opposite from the mounting surface shown in FIG. 8(a), which is a pattern surface where the antenna pattern (the pattern at the power receiving-side coil 421) is formed.

As shown in FIG. 8(a), a through hole 324, through which the crankshaft 17 (see FIG. 2) passes, is formed at the center of the rotating-side substrate 32. As the crankshaft 17 is fitted through the through hole 324, the rotating-side substrate 32 is locked so as to range perpendicular to the crankshaft 17. The connector 321 and circuit components 325a through 325g are mounted at the mounting surface so as to surround the through hole 324. Since the rotating-side substrate 32 rotates as one with the crankshaft 17, it is desirable that the connector 321, the circuit components 325a through 325g and a wiring connecting them be disposed so as to keep the level of centrifugal force applied to the rotating-side substrate 32 in balance, i.e., so as to achieve rotational symmetry with regard to the level of centrifugal force. In addition, the connector 321 allows the flexible cable 332 to be plugged in and out in a direction perpendicular to the substrate surface (along the axis of the crankshaft 17), as illustrated in FIG. 8(b). This structure makes it possible to prevent the flexible cable 332 from becoming disconnected due to the centrifugal force, The antenna pattern at the power receiving-side coil 421 is formed in a hatched area 322 at the pattern-forming surface of the rotating-side substrate 32. It is to be noted that a looped ground pattern is also formed at the rotating-side substrate 32 at a position further inward relative to the hatched area 322, as at the fixed-side substrate 31. In addition, the wiring pattern connecting the individual circuit components must be laid out by ensuring that it does not form a loop circling the through hole 324, in order to prevent magnetic interference between the wiring pattern and the antenna pattern at the pattern forming surface.

It is to be noted that a notch 323 is formed at the through hole 324 in order to ensure that the detection unit 331 (see FIG. 2) fixed to the outer circumferential surface of the crankshaft 17 is not allowed to interfere when the rotating-side substrate 32 is mounted at the crankshaft 17. The presence of the notch 323 formed as described above improves the ease of assembly.

Figure 9:
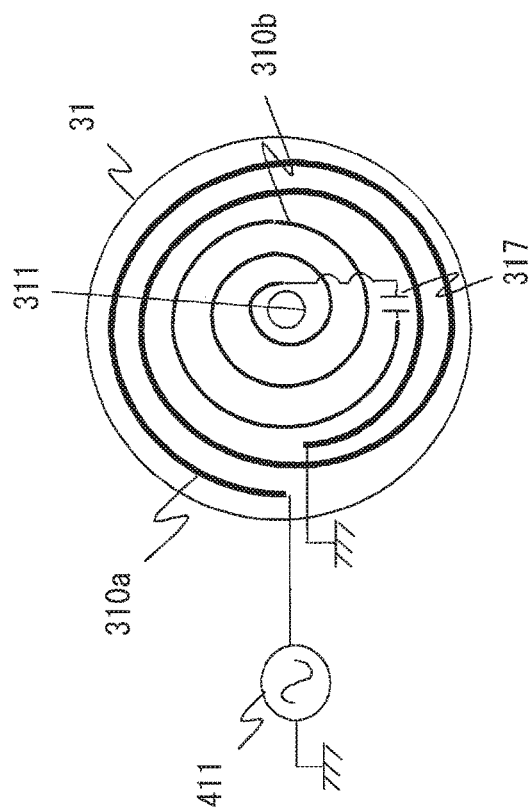
FIG. 9 A schematic illustration showing in detail the power feeding coil 310*a* and the resonance coil 310*b* configuring a power transmitting-side coil.

FIG. 9 is a schematic illustration sliming in detail the power feeding coil 310a, and the resonance coil 310b, which configure the power transmitting-side coil. It is to be noted that FIG. 9 shows the patterns separated from each over a gap wider than the actual gap formed between them so as to provide a clear view of the overall coil pattern. As explained earlier, the capacitor 317, which is to function as a resonance capacitor, is disposed at the resonance coil 310b. The resonance coil 310b is a spiral coil with a plurality of turns. The power feeding coil 310a, to with the oscillator 411 is connected, forms a pattern further outward relative to the resonance coil 310b. The power feeding coil 310a forms a spiral pattern with a plurality of turns (at least two turns).

While magnetic resonance coils are used in the embodiment, the magnetic resonance method assures advantages over the electromagnetic induction method in transmission efficiency, transmission distance, ease of coil alignment and the like. The magnetic resonance method further achieves advantages in that the power receiving-side coil can be readily miniaturized, that the extent of interference coupling is lowered (i.e., the effect of noise is reduced), that the extent to which efficiency is lowered by the metal casing and the like can be minimized, and the like. However, if the coil is scaled down relative to the transmission frequency (i.e., the self-resonance frequency of the coil), the transmission efficiency tends to be compromised. Such a decrease in the transmission efficiency is considered to be attributable to insufficient magnetic coupling with the resonance coil due to a lowered inductance value at the power feeding coil resulting from coil miniaturization. The decrease in the transmission efficiency tends to be more pronounced in a torque sensor installed in a motor-assisted bicycle, since the coil diameter in the torque sensor is typically only a few centimeters while the wavelength of the transmission frequency is approximately 10 to 20 m.

Accordingly, the power feeding coil 310a in the embodiment is disposed further outward relative to the resonance coil 310b and is wound with a plurality of turns, as shown in FIG. 9, so as to prevent a decrease in the inductance value at the power feeding coil 310a and minimize the extent to which the level of magnetic coupling between the power feeding coil 310a and the resonance coil 310b is lowered. In addition, while the crankshaft 17 constituted of metal is inserted through the through hole 311 formed at the fixed-side substrate 31, the magnetic effect imparted by the crankshaft 17 can be reduced by disposing the power feeding coil 310a further outward, as shown in FIG. 9, and this positional arrangement is also a contributing factor in minimizing any decrease in the power feeding efficiency.

Furthermore, by disposing the resonance coil 310b and the power receiving-side coil 421 so that their coil surfaces face opposite each other, effective magnetic coupling is achieved, which, in turn, improves the transmission efficiency. Moreover, in consideration of the effect of noise on data transmission, the magnetic resonance method, achieving a greater Q value (=f0/BW, f0: central frequency, BW: bandwidth of −3 dB relative to the gain of the central frequency f0) assures bater transmission efficiency and is not readily subject to the influence of noise. However. When a large value is taken for the Q value, the communication band is bound to be narrow. For this reason, it is desirable that a greater value be taken for the Q value at the power receiving-side coil 421 located on the data transmission side than the value taken for the Q value at the resonance coil 310b located on the data reception side in the embodiment in which the strain data are transmitted from the rotating-side substrate 32 to the fixed-side substrate 31.

Figure 10:
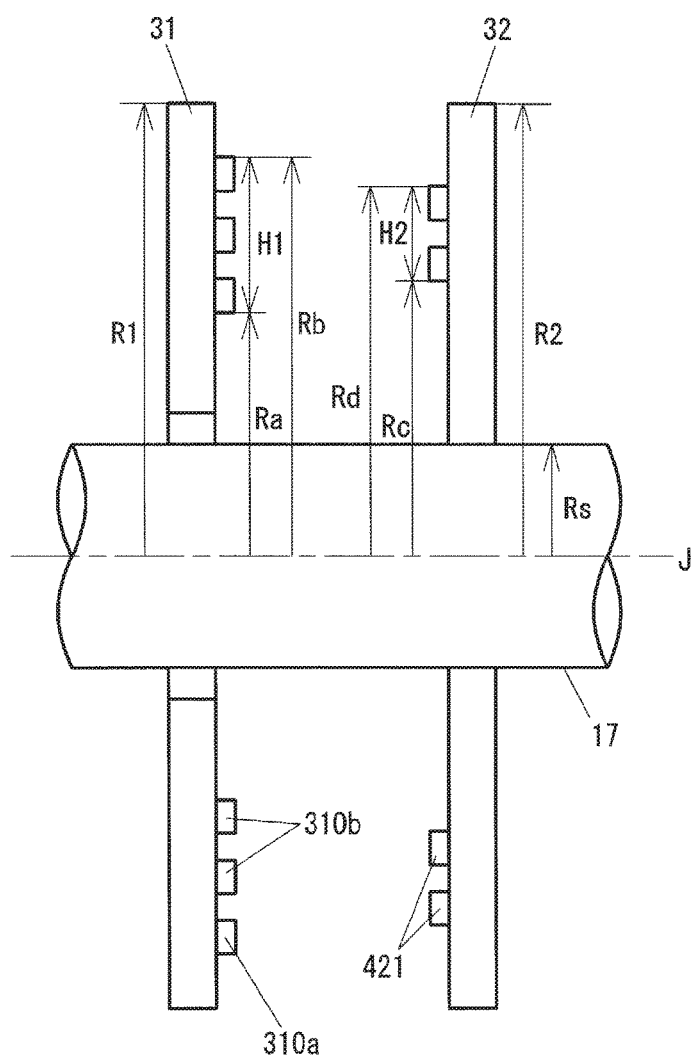
FIG. 10 A sectional view illustrating the positional arrangement adopted for the antenna patterns.

FIG. 10 is a sectional view illustrating the positional arrangement with which the antenna patterns are disposed. As explained earlier (see FIG. 2), the fixed-side substrate 31 and the rotating-side substrate 32 are disposed so that the surfaces thereof at which the antenna patterns are formed face opposite each other. Since power is exchanged and also data are exchanged between the resonance coil 310b and the power receiving-side coil 421 through magnetic coupling achieved by the resonance coil 310b and the power receiving-side coil 421, it is desirable that the distance between the resonance coil 310*b* and the power receiving-side coil 421 be narrowed for better communication efficiency by disposing the substrates 31 and 32 so that their coil surfaces face opposite each other. Accordingly, the fixed-side substrate 31 and the rotating-side substrate 32 are disposed so that their surfaces where the antenna patterns are formed face opposite each other. The antenna pattern 310, made up with the patterns of the power feeding coil 310*a* and the resonance coil 310*b* is formed at the fixed-side substrate 31, whereas the antenna pattern made up with the pattern of the power receiving-side coil 421 is formed at the rotating-side substrate 32.

It is to be noted that the fixed-side substrate 31 and the rotating-side substrate 32 are disposed so that the centers of the antenna patterns formed at these substrates (i.e., the coil centers are in alignment with an axis of the crankshaft 17. In addition, the exact numbers of turns at the individual patterns are not indicated in FIG. 10, which simply provides a clear view of the positional arrangement adopted for the antenna patterns.

It is desirable that the following pattern arrangement be adopted in order to achieve further efficiency in the magnetic coupling of the coils set facing opposite each other. In the following description, Ra represents the inner radius of the resonance coil 310*b* and Rb represents the outer radius of the power feeding coil 310*a* disposed further outward relative to the resonance coil 310*b* at the fixed-side substrate 31, whereas Rc and Rd respectively represent the inner radius and the outer radius of the power receiving-side coil 421 at the rotating-side substrate 32. In addition, the outer radii of the fixed-side substrate 31 and the rotating-side substrate 32 are respectively represented by R1 and R2. It is to be noted that if the substrates 31 and 32 are not round substrates, the radii R1 and R2 each represent the distance from the center of the corresponding antenna pattern to the closest edge of the particular substrate.

It is desirable that when Rc>Ra, Rb be set greater than Rc, whereas when Ra>Rc, Rd be set greater than Ra. Namely, Ra through Rd should be set on that an area H1 where the power transmitting-side coil is located and an area H2 where the power receiving-side coil is located are not completely offset from each other along the radial direction with at least portions thereof facing opposite each other. It is even more desirable that the average radius of the resonance coil 310*b* located on the power transmitting-side be set equal to the average radius of the power receiving-side coil 421.

In addition, it is desirable to set the antenna patterns at the greatest possible distances away from the crankshaft 17 in order to minimize the extent of magnetic influence of the crankshaft 17 constituted of metal. For instance, with Rs representing the radius of the crankshaft 17, settings should be selected so that Ra−Rs>R1−Rb and that Rc−Rs>R2−Rd.

Figure 11A:
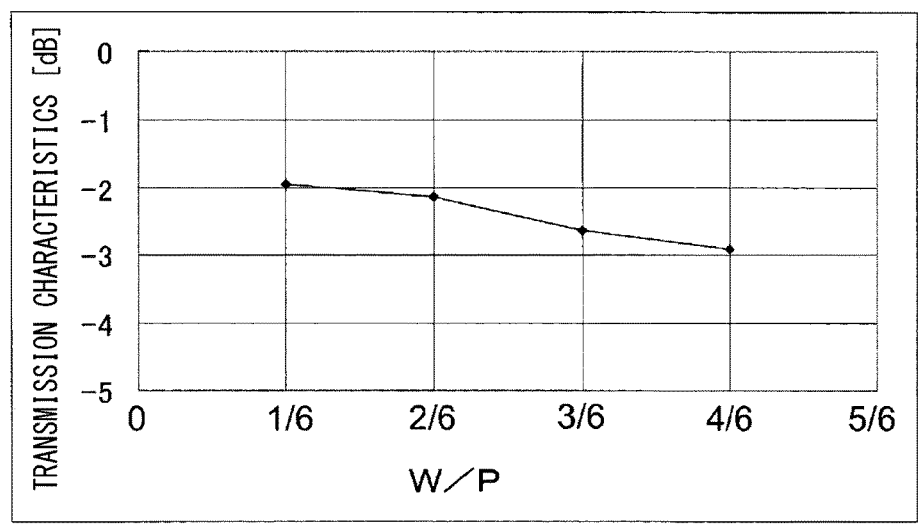
FIGS. 11A and 11B Diagrams indicating the relationship between an antenna pattern and transmission characteristics.
Figure 11B:
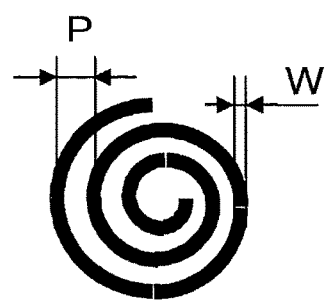

FIG. 11 presents diagrams indicating the relationship between an antenna pattern and transmission characteristics. FIG. 11(*a*) is a graph providing the results obtained by simulating the relationship between the line width of an antenna pattern and the transmission characteristics, whereas FIG. 11(*b*) provides a schematic illustration of an antenna pattern. P represents the pitch of adjacent pattern line portions in the pattern and W represents the pattern line width measurement. It is to be noted that the ratio of the pattern line width W to the pitch P (W/P) is indicated along the horizontal axis in FIG. 11(*a*). The following description will be given by assuming that the pitch P remains constant at 3 mm.

It is generally assumed that better transmission characteristics are achieved by increasing the pattern line width W since resistance is lowered at a greater pattern line width W. However, the simulation results indicate that the transmission characteristics are compromised when the distance between adjacent pattern line portions is narrowed due to the proximity effect whereby the successive pattern line portions affect each other. When W/P=3/6, the pattern line width W and the measurement of the gap between adjacent pattern line portions are equal to each other, whereas the transmission characteristics improve when the ratio W/P takes a value smaller than 3/6 and the transmission characteristics are further improved as the value taken for W/P becomes even smaller, as indicated in FIG. 11(*b*) While the simulation executed to obtain the results presented in FIG. 11(*a*) does not cover the range beyond W/P=3/6, it has been learned that the transmission characteristics become worse if the pattern line width W is further reduced to achieve a smaller value for the ratio W/P due to a significant increase in the coil resistance. In other words, it is desirable to suppress the proximity effect manifesting at the adjacent pattern line portions by taking a greater value for the coil gap (P−W) relative to the value taken for the pattern line width W of the coil.

FIG. 12 shows the strain sensor unit 33, with FIG. 12(*a*) showing it in a plan view and FIG. 12(*b*) presenting a sectional view taken along C-C. A sensor chip 333 with a built-in strain gauge is stuck to a thin metal plate (e.g., stainless steel sheet) 334. In addition to the strain gauge, a circuit needed for strain measurement, an A/D converter that converts a strain quantity signal to a digital signal, and the like are built into the sensor chip 333. One end of the flexible cable 332. Is fixed to the metal plate 334 and the sensor chip 333 and a wiring pattern (not shown) for the flexible cable 332 are connected via a wire 335. The other end of the flexible cable 332, constituted with, for instance, a flexible printed substrate, forms a connector portion 337 having a plurality of terminals 336 formed thereat. The sensor chip 333, the wire 335 and the wire connector portion of the flexible cable 332 are molded with a sealing resin 338.

It is to be noted that the sealing resin 338 is simply indicated with an imaginary line (two-point chain line) so as to indicate the positional arrangement and the like assumed at the chip. The rear surface of the metal plate 334 is stuck to the surface of the crankshaft 17, i.e., the strain measurement target. The metal plate 334 in the detection unit 331 is fixed to a portion of the outer circumferential surface of the crankshaft 17 that has been machined so as to achieve a flat surface. When strain occurs at the crankshaft 17, the metal plate 334 and the sensor chip 333 become deformed and thus, the strain quantity can be measured.

Figure 13:
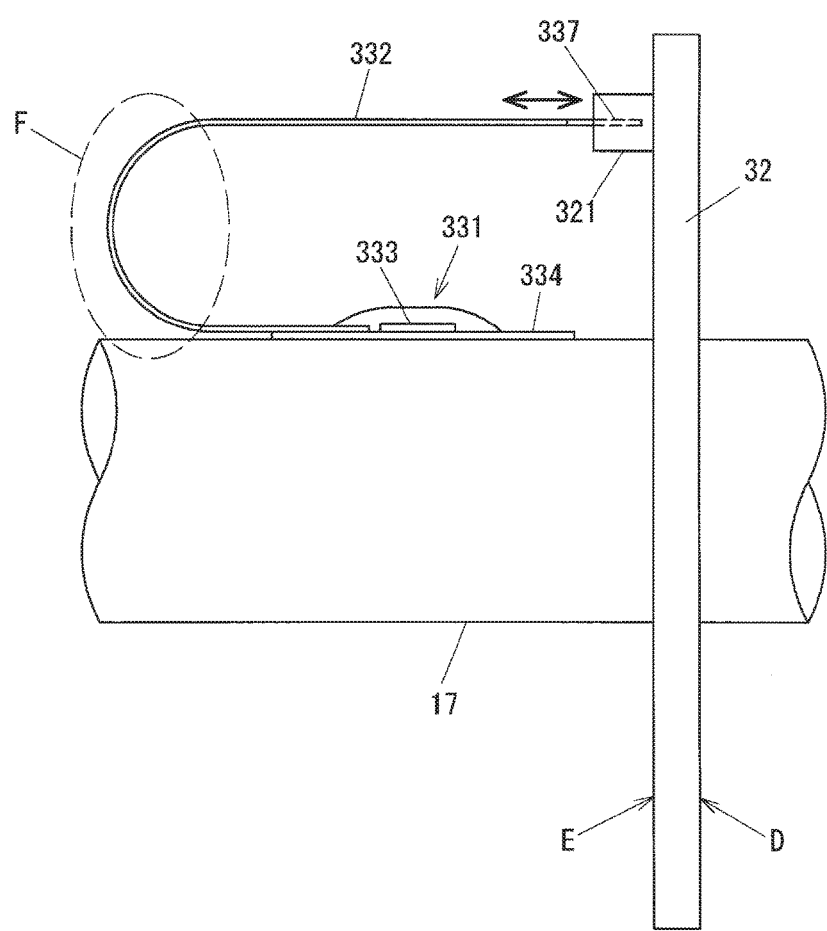
FIG. 13 A diagram illustrating the connection mode adopted for the connection of the flexible cable 332 to the rotating-side substrate 32.

FIG. 13 illustrates a connection mode that is adopted when connecting the flexible cable 332 to the rotating-side substrate 32 in a side view of the crankshaft 17, to which the detection unit 331 in the strain sensor unit 33 is fixed, and the rotating-side substrate 32. The rotating-side substrate 32 is mounted so that the substrate surface ranges perpendicular to the crankshaft 17. The connector 321, to which the connector portion 337 of the flexible cable 332 is connected, is disposed at the rotating-side substrate 32. The connector 321 is mounted at the rotating-side substrate 32 no that the connector portion 337 of the flexible cable 332 is plugged in and out along the directions running parallel to the crankshaft 17. The surface indicated by the letter D is the surface where the antenna pattern is formed, whereas the surface indicated by the letter E is the surface where the circuit components are mounted.

The detection unit 331 is stuck to the crankshaft 17 so that the flexible cable 332 is led out from the detection unit 331 along the direction running away from the circuit component mounting surface E of the rotating-side substrate 32. The flexible cable 332 led out from the detection unit 331 is then bent so as to form a circular arc and ran toward the circuit component mounting surface E and is connected to the connector 321 at the rotating-side substrate 32. By adopting a mode such as that shown in FIG. 13 when mounting the detection unit 331 and connecting the flexible cable 332, the curvature of the bent portion (indicated by the dotted line F) of the flexible cable 332 can be reduced and as a result, the flexible cable does not break readily, thereby assuring better reliability.

The rotating body non-contact power-feeding device achieved in the embodiment described above includes the rotating-side substrate 32 with power receiving-side circuit components disposed thereat, which is fixed to the crankshaft 17 supported by the bearing unit 181 and rotates as one with the crankshaft 17, and the fixed-side substrate 31 with power transmitting-side circuit components mounted thereat, which is fixed to the bottom bracket 18 holding the bearing unit 181 so that the substrate surface of the fixed-side substrate faces opposite the substrate surface of the rotating-side substrate 32 and is connected with a power source. While the fixed-side substrate 31 includes a substrate front surface and a substrate back surface, a spiral power transmitting-side coil (configured with the power feeding coil 310*a* and the resonance coil 310*b*) having a plurality of turns is formed with a conductive pattern at one of these substrate surfaces, which faces opposite the rotating-side substrate 32, with the power transmitting-side circuit components mounted at the other substrate surface. Likewise, while the rotating-side substrate 32 includes a substrate front surface and a substrate back surface, a spiral power receiving-side coil 421 with a plurality of turns is formed with a conductive pattern at a substrate surface that faces opposite the fixed-side substrate 31 with the power receiving-side circuit components mounted at the other substrate surface. As the resonance coil 310*b* and the power receiving-side coil 421 become magnetically coupled, power is fed from the fixed-side substrate 31 to the rotating-side substrate 32 contactlessly.

As described above, the coils 310*a*, 310*b* and 421 are formed with coil patterns at the substrate surfaces of the substrates 31 and 32 and the resonance coil 310*b* located on the power transmitting side and the power receiving-side coil 421 are set so as to face opposite each other, resulting in a compact non-contact power-feeding device assuring outstanding power feeding efficiency.

In addition, it is desirable that the power transmitting side antenna coil be configured with a flat-plane spiral resonance coil 310*b* having a plurality of turns and a flat-plane spiral power feeding coil 310*a* having a plurality of turns, disposed further outward relative to the resonance coil 310*b* so as to surround the resonance coil 310*b*, which is magnetically coupled with the resonance coil 310*b*. Since this configuration makes it possible to ensure that sufficient inductance is achieved at the power feeding coil 310*a*, a satisfactory level of power feeding efficiency can be assured even if the power transmitting-side coil is miniaturized.

It is to be noted that while the power receiving-side coil is configured with a single power receiving-side coil 421 in the embodiment described above, it may instead be configured with two coils (a resonance coil and a load coil, to which the rectifier circuit 423 is connected as on the power transmitting side, or the power transmitting-side coil and the power receiving-side coil may each be configured with a single coil such as the power receiving-side coil 421 explained above. In addition, while the load circuit in the embodiment described above is configured with the strain sensor unit 33, which includes a strain gauge, the present invention may instead be adopted in conjunction with a load circuit configured with a temperature sensor circuit, an acceleration sensor circuit or the like instead of a strain sensor circuit. Furthermore, while the fixed-side substrate 31 and the rotating-side substrate 32 in the torque sensor installed in the motor-assisted bicycle in the embodiment explained above assume a ring shape with through holes at which the crankshaft 17 is inserted, the torque sensor achieved in the embodiment may instead be used to measure torque applied to another rotating shaft or another rotating body. In such a case, a rotating-side substrate in a disk shape may be fixed to an end surface of the rotating shaft and a fixed-side substrate in a disk shape may be fixed to a member that holds a bearing.

In addition, the present invention teaching a technology for contactlessly feeding power to a circuit or a sensor mounted at a rotating body such as, for instance, a shaft, and contactlessly extracting data from a rotating body sensor, may be adopted in contactless power feeding to a strain gauge or a strain sensor used to detect torque in an automobile drive train or to detect pedaling force in a motor-assisted bicycle, and in contactless data transmission. It may be further adopted in a non-contact power-feeding device in which the positional relationship between the power receiving-side coil and the power transmitting-side coil is not fixed, e.g., in a configuration in which a power receiving side IC card is moved closer to the fixed power transmitting side for purposes of power feed.

The embodiments described above may be adopted individually or they may be adopted in combination so as to achieve the advantages of the individual embodiments or to achieve synergetic advantages. In addition, as long as the features characterizing the present invention remain intact, the present invention is in no way limited to the particulars of the embodiments described above.

The disclosure of the following priority application is herein incorporated by reference:

Japanese Patent Application No. 2014-8086 filed Jan. 20, 2014

REFERENCE SIGNS LIST

1 ... motor-assisted bicycle, 17 ... crankshaft, 18 ... bottom bracket, 21 ... pedal, 24 ... motor, 27 ... assist control unit, 30 ... torque sensor, 31 ... fixed-side substrate, 32 ... rotating-side substrate, 33 ... strain sensor unit, 310 ... antenna pattern, 310*a* ... power feeding coil, 310*b* ... resonance coil, 315 ... ground pattern, 331 ... detection unit, 332 ... flexible cable, 333 ... sensor chip, 334 ... metal plate, 410 ... power-transmitting unit, 411 ... oscillator, 412 ... demodulating circuit, 413 ... clock (CLK) generating unit, 414 ... modulating unit, 415 ... driver, 420 ... power-receiving unit, 421 ... power receiving-side coil, 422 ... resonance capacitor, 423 ... rectifier circuit, 424 low pass filter, 425 ... power circuit, 426 ... load modulating circuit, 427 ... clock (SCLK) generating unit, 428 ... request signal (REQ) detection unit

The invention claimed is:

1. A rotating body non-contact power-feeding device, comprising:
   a power receiving-side substrate with a power receiving-side circuit component mounted thereat, which is fixed to a rotating shaft supported via a bearing and rotates as one with the rotating shaft; and a power transmitting-side substrate with a power transmitting-side circuit component mounted thereat, which is fixed to a holding unit holding the bearing so that a substrate surface thereof faces opposite a substrate surface of the power receiving-side substrate and is connected with a power source, wherein:

a power transmitting-side coil is formed with a conductive pattern so as to achieve a flat-plane spiral pattern with a plurality of turns at a substrate surface facing opposite the power receiving-side substrate and the power transmitting-side circuit component is mounted at another substrate surface, at the power transmitting-side substrate that includes a substrate front surface and a substrate back surface, a power receiving-side coil is formed with a conductive pattern so as to achieve a flat-plane spiral pattern with at least one turn at a substrate surface facing opposite the power transmitting-side substrate and the power receiving-side circuit component is mounted at another substrate surface, at the power receiving-side substrate that includes a substrate front surface and a substrate back surface; and the power transmitting-side coil and the power receiving-side coil are magnetically coupled with each other so as to allow power to be contactlessly fed from the power transmitting-side substrate to the power receiving-side substrate, wherein a looped first shield pattern is formed at the power transmitting-side substrate inward relative to the conductive pattern at the power transmitting-side coil so as to surround the rotating shaft, and a looped second shield pattern is formed at the power receiving-side substrate inward relative to the conductive pattern at the power receiving-side coil so as to surround the rotating shaft.

2. The rotating body non-contact power-feeding device according to claim 1, wherein:

a gap between adjacent pattern line portions is set greater than a pattern line width in the conductive pattern at the power transmitting-side coil; and the power receiving-side coil assumes a plurality of turns and a gap between adjacent pattern line portions is set greater than a pattern line width at the power receiving-side coil.

3. The rotating body non-contact power-feeding device according to claim 1, wherein:

the power receiving-side circuit component generates data to be transmitted to the power transmitting-side substrate; and a load modulating circuit, which enables data transmission from the power receiving-side coil to the power transmitting-side coil by altering a power receiving side impedance based upon the data, is disposed at the power receiving-side substrate.

4. The rotating body non-contact power-feeding device according to claim 3, wherein:

a Q value for the power receiving-side coil is set greater than a Q value for the power transmitting-side coil.

5. A torque sensor, comprising:

the rotating body non-contact power-feeding device according to claim 3; and a torque measuring strain gauge fixed to the rotating shaft, which is engaged in operation with electric power fed from the power transmitting-side substrate to the power receiving-side substrate, wherein:

the load modulating circuit alters the power receiving side impedance based upon strain data detected via the torque measuring strain gauge.

6. The torque sensor according to claim 5, further comprising:

a flexible cable that connects the torque measuring strain sensor to the power receiving-side substrate, wherein:

the torque measuring strain gauge is fixed to the rotating shaft so that the flexible cable is led out from the torque measuring strain gauge along a direction running away from the substrate surface at which the power receiving-side circuit component is mounted; and the flexible cable led out from the torque measuring strain gauge is bent in a circular arc and is connected to the power receiving-side substrate.

7. The torque sensor according to claim 5, wherein:

at least three through holes, at which the power transmitting-side substrate is screwed onto the holding unit, are formed in a peripheral area of the power transmitting-side substrate; and the plurality of through holes are set apart from the center of the power transmitting-side coil formed at the power transmitting-side substrate by distances different from one another.

8. The rotating body non-contact power-feeding device according to claim 1, wherein:

at least part of a pattern area where the conductive pattern is formed at the power transmitting-side coil faces opposite a pattern area where the conductive pattern is formed at the power receiving-side coil.

9. The rotating body non-contact power-feeding device according to claim 8, wherein:

the power transmitting-side substrate and the power receiving-side substrate are each a circular substrate and the rotating shaft passes through the power transmitting-side substrate and the power receiving-side substrate so that an axial center thereof is in alignment with centers of the power transmitting-side coil and the power receiving-side coil;

a difference between an inner diameter of the power transmitting-side coil and an outer diameter of the rotating shaft is greater than a difference between an outer diameter of the power transmitting-side substrate and an outer diameter of the power transmitting-side coil; and a difference between an inner diameter of the power receiving-side coil and the outer diameter of the rotating shaft is greater than a difference between an outer diameter of the power receiving-side substrate and an outer diameter of the power receiving-side coil.

10. A rotating body non-contact power-feeding device according to claim 1, wherein:

the power receiving-side circuit component and wiring connecting the power receiving-side circuit component are disposed at the power receiving-side substrate so that rotational symmetry is achieved with respect to centrifugal force applied to the power receiving-side substrate.

11. A rotating body non-contact power-feeding device, comprising:

a power receiving-side substrate with a power receiving-side circuit component mounted thereat, which is fixed to a rotating shaft supported via a bearing and rotates as one with the rotating shaft; and a power transmitting-side substrate with a power transmitting-side circuit component mounted thereat, which is fixed to a holding unit holding the bearing so that a substrate surface thereof faces opposite a substrate surface of the power receiving-side substrate and is connected with a power source, wherein:

a power transmitting-side coil is formed with a conductive pattern so as to achieve a flat-plane spiral pattern with a plurality of turns at a substrate surface facing opposite the power receiving-side substrate and the power transmitting-side circuit component is mounted at another substrate surface, at the power transmitting-side substrate that includes a substrate front surface and a substrate back surface, a power receiving-side coil is formed with a conductive pattern so as to achieve a flat-plane spiral pattern with at least one turn at a substrate surface facing opposite the power transmitting-side substrate and the power receiving-side circuit component is mounted at another substrate surface, at the power receiving-side substrate that includes a substrate front surface and a substrate back surface; and the power transmitting-side coil and the power receiving-side coil are magnetically coupled with each other so as to allow power to be contactlessly fed from the power transmitting-side substrate to the power receiving-side substrate, wherein at least part of a pattern area where the conductive pattern is formed at the power transmitting-side coil faces opposite a pattern area where the conductive pattern is formed at the power receiving-side coil, the power transmitting-side substrate and the power receiving-side substrate are each a circular substrate and the rotating shaft passes through the power transmitting-side substrate and the power receiving-side substrate so that an axial center thereof is in alignment with centers of the power transmitting-side coil and the power receiving-side coil, a difference between an inner diameter of the power transmitting-side coil and an outer diameter of the rotating shaft is greater than a difference between an outer diameter of the power transmitting-side substrate and an outer diameter of the power transmitting-side coil, and a difference between an inner diameter of the power receiving-side coil and the outer diameter of the rotating shaft is greater than a difference between an outer diameter of the power receiving-side substrate and an outer diameter of the power receiving-side coil.

12. A rotating body non-contact power-feeding device, comprising:

a power receiving-side substrate with a power receiving-side circuit component mounted thereat, which is fixed to a rotating shaft supported via a bearing and rotates as one with the rotating shaft; and a power transmitting-side substrate with a power transmitting-side circuit component mounted thereat, which is fixed to a holding unit holding the bearing so that a substrate surface thereof faces opposite a substrate surface of the power receiving-side substrate and is connected with a power source, wherein:

a power transmitting-side coil is formed with a conductive pattern so as to achieve a flat-plane spiral pattern with a plurality of turns at a substrate surface facing opposite the power receiving-side substrate and the power transmitting-side circuit component is mounted at another substrate surface, at the power transmitting-side substrate that includes a substrate front surface and a substrate back surface, a power receiving-side coil is formed with a conductive pattern so as to achieve a flat-plane spiral pattern with at least one turn at a substrate surface facing opposite the power transmitting-side substrate and the power receiving-side circuit component is mounted at another substrate surface, at the power receiving-side substrate that includes a substrate front surface and a substrate back surface; and the power transmitting-side coil and the power receiving-side coil are magnetically coupled with each other so as to allow power to be contactlessly fed from the power transmitting-side substrate to the power receiving-side substrate, wherein the power receiving-side circuit component and wiring connecting the power receiving-side circuit component are disposed at the power receiving-side substrate so that rotational symmetry is achieved with respect to centrifugal force applied to the power receiving-side substrate.

* * * * *